Aug. 7, 1934.                    W. M. BAILEY                    1,969,346
                              ELECTRIC CONDENSER
                              Filed Jan. 27, 1932
Fig. 1
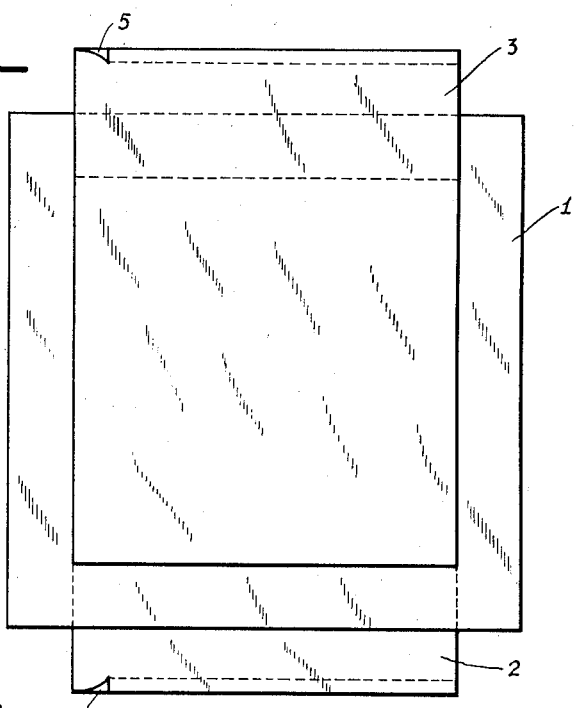
Fig. 2
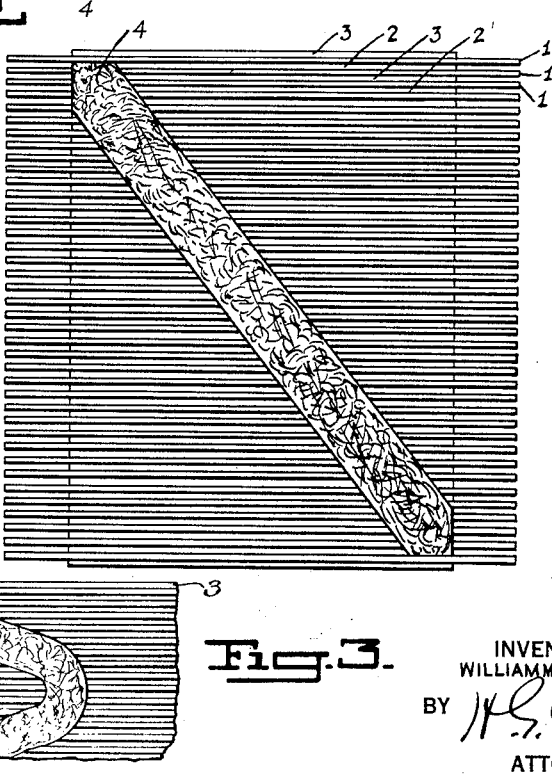
Fig. 3
INVENTOR
WILLIAM M. BAILEY
BY
ATTORNEY Patented Aug. 7, 1934

1,969,346

UNITED STATES PATENT OFFICE 1,969,346

ELECTRIC CONDENSER

William Mason Bailey, White Plains, N. Y., assignor to Radio Corporation of America, a corporation of Delaware Application January 27, 1932, Serial No. 589,201

6 Claims. (Cl. 175—41)

This invention relates to improvements in electrical condensers.

An object of this invention is to improve the construction of condensers, and more particularly, to prevent any tendency to shear the conductive elements when the condenser is placed under compression.

I have found that when a large number of conducting and insulating sheets are built up alternately, forming a relatively thick condenser stack with the alternate conductive sheets or foils soldered together in the usual prior art manner, that there is a tendency for some or all of the foils to tear or shear. This is especially true when the stack is highly compressed during the condenser building process. The tearing off or shearing of these foils becoming more markedly increased when the condenser stack reaches the proportions of being approximately as thick or thicker than 1" (one inch) as in the case of a large capacity per section of parallel connected foils. This shearing or tearing of the foils results in a change of capacity and an accompanying damage to the remaining connected foils of the section for the reason that undue electrical potential stresses are put upon the remaining conductive elements of the condenser stack remaining in the circuit. Likewise, when a group of parallel connected foils are assembled together and soldered in the usual prior art manner, there is a danger of the shearing or tearing off of the foils due to expansion and contraction of the sections when the condenser is placed in a circuit which will cause a change in temperature.

Other features and advantages will be apparent from the drawing and description.

Fig. 1 is a plan view of the stack of this invention;

Fig. 2 is an elevation of the stack of this invention.

Fig. 3 is a partial elevation of the stack showing a modification of the soldered path.

The invention is best shown in Fig. 1 in which 1 is an insulating sheet or mica dielectric approximately 2" x 2" square and .002" thick; the armatures or conductive foils 2 are approximately 1½" wide x 2" long and .001" thick, which project on one side slightly, or approximately 1/16" beyond the dielectric 1. The other foil armature 3 of opposite potential likewise projects slightly beyond the dielectric 1 but in the opposite direction from that of 2. A diagonol path 4 is formed by soldering the foils 2 as will be seen more clearly by reference to Fig. 2 of the drawing. A similar soldered path 5 is formed by soldering the foils 3.

These paths of solder 4 and 5 extend from the lower right hand corner of the condenser stack to the upper left hand corner, as shown more clearly in Fig. 2.

In the building up this improved stack a sheet of conductive material 2 such as lead or any other suitable metal, is placed on top of the mica sheet 1 with an equal space on each side to form a side margin, and one end of the foil projecting beyond the mica sheet for soldering the opposite end stopping short of the mica to form an end margin equal to or greater than the side margin.

Next, a similar sheet of mica 1 is placed over the conductive foil 2, and another sheet of conductive foil 3 is placed on top of the mica sheet with proper margins as described above, these conductive sheets 2 and 3 are continued to be assembled in alternate fashion until the proper number of foils and micas are assembled to give the desired capacity. Then the adjacent projecting ends of the foils 2 and 3 are ready to be soldered. Heretofore in the process of the soldering of these projecting foil ends along a line normal or right angles to the surface of the foils, there was a gradual increase in the thickness of the foils which, as a result of this gradual increase of solder coated projecting foil ends, the foils were sheared or torn off during the process of stack compression and assembly, or even after the condenser was placed in service due to temperature changes which caused expansion or contraction. Furthermore, when the solder coated projecting lead foil ends were coated with solder, and due to the natural tendency of the solder to flow in toward the mica dielectrics, the projecting foil ends were rendered more or less brittle due to the fact that the ordinary commercial solder is composed of approximately 50% zinc. The projection of the solder coated foil ends beyond the mica dielectrics might be described as a rigid wall held together and in line by a multiplicity of thin lead members and during the process of compressing the stack this wall of solder coated foils will not compress as easily or line up as readily the projecting portion of the foil ends with the new or lower positions taken by the conductor foils within the mica dielectric. Therefore, as a result of this failure of the above mentioned brittle metallic wall to line up with the foils of the condenser stack, there is a marked tendency for the foils to shear or tear off at the point where the foils enter the bounds within the mica sheet. In practical manufacture of such sections the shearing and tearing of the foils was particularly noticeable when the section thickness exceeded 1" in height. By soldering the foils in accordance with the present invention, in the manner shown in Fig. 2, there is no substantial building up of the solder coated lead foils over the entire projecting portion for the reason that the point of soldering and the corresponding shearing point is continuously changed as the soldering process progresses upwardly along the sides of the stack and it therefore follows that there can be no point where the increased thickness of the solder coated projecting foil ends adds in such a manner as to cause shearing or tearing off of the foils.

Although this invention has been described as embodied in a particular form or arrangement of parts, it should be understood that it is capable of embodiment in other and different forms such as the soldered path extending from one corner of the section to another, but running in wavy or zig-zag lines as shown in Fig. 3, instead of the diagonal line or in any other manner in which the shearing point at the projecting foil ends are altered, within the spirit and scope of the appended claims.

What I claim is:

1. An electric condenser comprising alternate conducting and insulating sheets forming a section, said conductive sheets being soldered on opposite sides in a diagonal path extending from a bottom corner of the section to the opposite top corner.

2. A condenser section comprising a stack of alternate assembled layers of conductive and mica sheets subjected to high pressure and a soldered path on opposite ends of said section extending in a diagonal line from a bottom corner to the opposite top corner of the section.

3. A high potential condenser section comprising a plurality of conductive sheets assembled to form a stack subjected to high compressor force, said section being soldered in a path-like manner, said path progressing in a line forming an oblique angle to prevent shearing of the foils when the stack of condenser conductive sheets is compressed.

4. A high potential condenser comprising a relatively large number of mica and foil sheets to form a section that is as high or higher than 1" and diagonally soldering the foils in a path extending from one corner of the section to another to prevent tearing of the foils caused by expansion and contraction of the condenser stack.

5. A condenser comprising a section of alternate assembled layers of conductive and mica sheets subjected to high pressure, the conductive sheets soldered in a path whose width is narrower than the conductive sheets on each end of said section, said path extending in a wavy line from the bottom to top foil of said section.

6. A high potential condenser comprising a relatively large number of mica and foil sheets to form a section that is as high or higher than one inch, and a soldered path extending from the top to the bottom of the section so that nowhere on the said section the path is in a direct vertical plane with respect to the section so as to prevent tearing of the foils caused by expansion and contraction of the condenser section.

WILLIAM MASON BAILEY.